United States Patent [19]
Speckhard et al.

[11] Patent Number: 6,137,519
[45] Date of Patent: Oct. 24, 2000

[54] SYSTEM AND METHOD FOR REDUCING STRIATIONS IN ELECTROSTATIC PRINTING

[75] Inventors: Thomas A. Speckhard, Cottage Grove, Minn.; Takashi Horikawa, Kanagawa, Japan

[73] Assignees: 3M Innovative Properties Company, St. Paul, Minn.; Nippon Steel Corporation, Kanawawa, Japan

[21] Appl. No.: 08/873,997

[22] Filed: Jun. 12, 1997

[51] Int. Cl.[7] .................................................. B41J 2/39
[52] U.S. Cl. ................................................... 347/147
[58] Field of Search .............................. 347/13, 145, 147, 347/180–182, 142; 358/470, 300, 478

[56]        References Cited

U.S. PATENT DOCUMENTS

| 3,942,080 | 3/1976  | Milewski       | 361/229 |
|-----------|---------|----------------|---------|
| 5,053,793 | 10/1991 | White et al.   | 347/145 |
| 5,061,948 | 10/1991 | Hansen et al.  | 347/145 |
| 5,130,823 | 7/1992  | Bowers         | 358/465 |
| 5,150,133 | 9/1992  | Ohigashi       | 347/149 |
| 5,237,339 | 8/1993  | Ichikawa       | 347/130 |
| 5,502,478 | 3/1996  | Mimura         | 347/237 |
| 5,515,095 | 5/1996  | Matsuda et al. | 347/145 |
| 5,579,089 | 11/1996 | Folkins        | 399/169 |
| 5,594,533 | 1/1997  | Katoh          | 399/61  |

FOREIGN PATENT DOCUMENTS

| 0 165 178A | 12/1985 | European Pat. Off. . |
| 0680827 A2 | 11/1995 | European Pat. Off. . |
| 2 415 327A | 8/1979  | France . |
| 788069     | 12/1980 | Russian Federation . |
| 1097968    | 6/1982  | Russian Federation . |
| 2 013 140  | 8/1979  | United Kingdom . |

OTHER PUBLICATIONS

Patent Abstracts of Japan for Japanese Kokai Patent Publication 56–166082A, Dec. 19, 1981.
Patent Abstracts of Japan for Japanese Kokai Patent Publication 01–186335A, Jul. 25, 1989.
Patent Abstracts of Japan for Japanese Kokai Patent Publication 57–087971A, Jun. 1, 1982.
Derwent Abstract for FR 2 415 327A, France, Aug. 17, 1979.

*Primary Examiner*—N. Le
*Assistant Examiner*—Michael Nghiem
*Attorney, Agent, or Firm*—Dale A. Bjorkman

[57]        ABSTRACT

A system and method of reducing striations in electrostatic printing is provided by varying plate firing sequences in a pattern of nib groups on the writing head of an electrostatic printer to visually mute the effects of sequence striations. This variation, in combination with other techniques, minimize multiplexing striations that affect adversely the print quality of data emerging from high speed, wide width electrostatic printers.

20 Claims, 2 Drawing Sheets

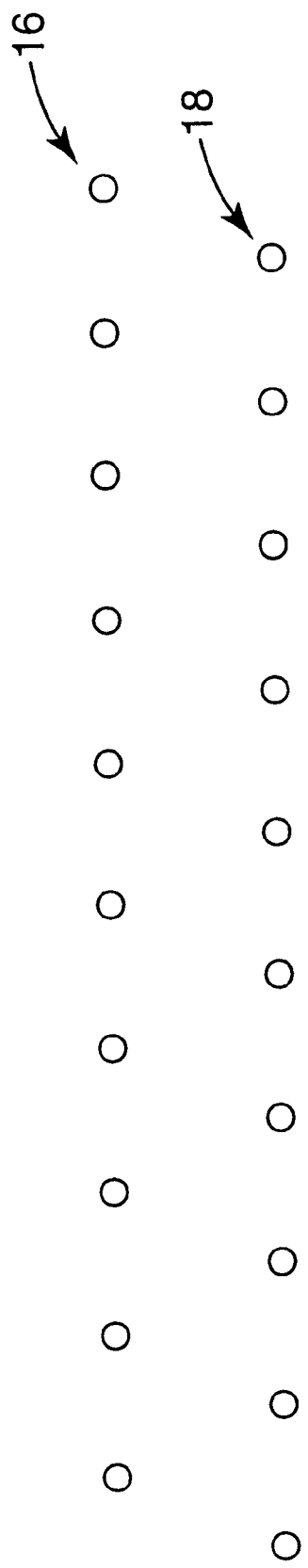

SYSTEM AND METHOD FOR REDUCING STRIATIONS IN ELECTROSTATIC PRINTING

FIELD OF INVENTION

This invention relates to a method for reducing striations in electrostatic printing.

BACKGROUND OF INVENTION

The most expensive part of an electrostatic printer is the writing head. The most expensive part of the writing head is the high voltage driver chips that switch on the 300–600 volts needed to deposit an electrostatic charge on dielectric media that passes over the writing head.

To reduce the number of driver chips needed, many printer manufacturers commonly employ a method known as multiplexing whereby multiple numbers of nib electrodes, also known as needle electrodes or stylii, are wired in parallel. To allow firing of individual nibs, the nib voltage is set to a level, such that charge deposition only occurs when there is simultaneous firing by complementary (or plate) electrodes. These complementary electrodes are fired in a sequential pattern across the writing head, so that at any one point in time, only the nibs activated across from the energized plate electrodes are energized to write data on the dielectric media passing over the writing head. A review of the technology is provided in U.S. Pat. No. 5,515,095 (Matsuda et al.).

Unfortunately multiplexing creates problems even as it reduces the number of nib drivers. Multiplexing produces a number of undesired artifacts including various downweb (process direction) striations due to uneven crossweb charge density. Striations become noticeable after toning of the dielectric media.

There are at least three types of multiplexing striations. The most common type are "multiplexing lines" or "multiplexing striations" which are more precisely called "nib group boundary striations". These striations occur due to the fact that the printer activates the nibs in groups. U.S. Pat. No. 5,053,793 (White et al.) discloses a method for reducing nib group boundary striations.

A second type of striation associated with multiplexing is what has been termed in some companies as "plate gap striations". These are either low density or high density striations associated with the gap between two plates.

A third type of striation is what is termed a "sequence striation". This striation is again a result of the fact that the nibs are fired in groups. In this type of striation, the problem is that the effect of pulsing the plates and energizing the nibs sets up fields in the media under adjacent sets of nibs (that are not currently activated but will be activated later) that can affect the fields set up when the adjacent group of nibs is energized. The resulting striation has a variation in charge density or optical density that varies across the nib group from left to right and results in a harsh transition at the nib group boundary. It also appears that sequence striations can also be observed from nib groups that are not adjacent but two nib groups away from each other, if the time between firings of the two nib groups is not long enough.

There are several known approaches to reducing sequence striations, each with their own problems. One is to pick a sequence pattern that maximizes the amount of time between writing on nearest neighbor and 2nd nearest neighbor groups. Slowing the printer will also increase time between firings but reduce equipment productivity. Reducing the "on" time for the groups will also reduce these striations. However, this leads to reduced density and possibly increased dropouts, i.e., locations where intended imaging of data does not appear.

Another approach is identified by USSR Authorship Certificates 788069 and 1097968 where the method of line-by-line electrostatic recording of information in adjacent zones is carried out in opposite directions.

U.S. Pat. No. 5,061,948 (Hansen et al.) describes an approach to reduce sequence striations whereby the firing scheme is designed to try to balance out the field effects (or "perturbations" as described by Hansen et al.) by writing "in-between" previously written areas or in areas far enough away from previously written areas that there is essentially no field effect. In their optimized mode, Hansen et al. describe a firing scheme where the scan line is written from the center out to the edges with alternate writing on one side of the head and then the other—the so-called "Ping-Pong" approach. The resulting firing over time has a chevron, or flying "V" formation from the center to the edges. Hansen et al. realize that this approach may not eliminate all the striations since there will be some difference between groups written on a "forward step" (writing in a "unperturbed" area) versus a "return step" (writing in an area of approximately balanced perturbations). To overcome this Hansen et al. recommend leading with an "B" group instead of the usual "A" group on alternating scan lines.

SUMMARY OF INVENTION

The present invention solves the problem of sequence striations using an unexpectedly facile and subtle approach. Hansen et al. undertakes a complicated firing sequence on each scan line that "splits the difference" from the center to each edge in an alternating "Ping-Pong" group firing pattern to attempt to minimize sequence striations.

The present invention recognizes that a sequence striation is primarily a result of pulsing the writing head plates and is much less affected by the field set up by the nibs. Thus, the effect is similar at all fill levels and independent of number of nibs fired, unlike standard multiplexing at nib group boundaries.

Rather than attempting to minimize sequence striations, the present invention uses an approach of "averaging" the sequence striations in a pattern from one scan line to the next by switching between two or more different plate firing sequences such that the individual sequence striations in different locations on different scan lines average out visually to the human eye. In other words, human perception of the striations is muted even though the sequence striations still exist.

In this invention, a "plate firing sequence" means the timing of firing a group of nibs and plate electrodes by energizing those nibs and a corresponding group of plate electrodes along an individual scan line or lines until all groups have fired. A "pattern" means the variation of plate firing sequences for multiple scan lines.

Depending on the nature of the printer, its hardware configuration, and software or firmware that drives the hardware, one can employ the present invention to provide a pattern of any possible combination of plate firing sequences for groups of nibs and plate electrodes moving in a firing pattern from at least one scan line(s) to at least a second scan line(s) in order to "visually mute" the sequence striations by varying their actual location from one set of scan line(s) to another set of scan line(s).

The present invention is designed to balance the interaction between printing data and the pattern of plate firing sequences of individual scan line(s) to minimize the appearance of sequence striations, whether or not such striations actually exist.

The appearance of sequence striations can be influenced by as many as five different environmental factors:

1. Media conductivity can be influenced by the temperature, pressure, and humidity of the environment in which the electrostatic printing occurs. Humidity especially can affect the conductivity of the media, and hence the appearance of sequence striations as the firing pattern proceeds.

2. The choice of half tone pattern also can influence the appearance of sequence striations because the half tone pattern determines the image quality and any disruption of those patterns can be different from one pattern to the next, due to sequence striations. As many as 9 or more different half tone patterns can be programmed into controller circuitry of a single electrostatic printer. With that variability of this factor, one should manage sequence striations to be able to match the best solution with each half tone pattern available for electrostatic printing.

3. The "fill level" of the selected image and the rate of change of the fill level across an image also can affect how much sequence striations are present.

4. The viewing distance also can affect how much sequence striations affect image quality. When viewing distance is known, the importance of sequence striations can be taken into consideration.

5. The applied voltages, particularly the plate voltages, also can affect the amount of noticeable sequence striations.

An excellent solution to visually muting sequence striations, per se, may generate other problems, such as density variation between nib groups or interference patterns with the designed half tone pattern or plate gap striations. Therefore, one should take the environmental factors into consideration as the best balanced solution for visually muting sequence striations is accomplished. A number of variables should be entertained to determine the best balanced solution that does not generate other noticeable problems.

One aspect of the present invention is the use of any combination of at least six variables to visually mute sequence striations without unduly generating other objectionable artifacts:

1. The number of lines in a pattern. Unlike as disclosed in the USSR Authorship Certificates, the present invention requires at least four lines in any pattern and can be as many as 56 or more.

2. The number of sets of lines in a pattern, which can be as few as 2 times and as many as the number of lines in a pattern. For example, in a 28 line pattern, one can have 2 sets of 14 lines each or 28 sets of one line each. One should take care in selecting the number of sets of lines in a pattern depending on the type of half tone pattern to be used for electrostatic printing because changes in firing order from one line to the next can create density variations from one nib group to the next or interference patterns with the half tone fill pattern.

3. The starting position of firing of nib groups in one line compared to adjacent lines, which can range from a totally random starting position on each line to the same starting point on each line of the pattern. It is preferred to maximize consistency of the differential in firings between neighboring nibs on adjacent lines from one nib group to the next, which militates toward the random end of the spectrum of possibilities in order to minimize density variation from one nib group to the next.

4. The firing order within a single line, which can range from seriatim to random. For example, in any given line, one can fire consecutive nibs or fire one nib and skip two nibs (called a "Skip 3" firing order) or fire one nib and skip 12 nibs (called a "Skip 13" firing order). In an analogy to music, one can create a firing order that has 3/3 time with a first beat sound followed by a two beat rest.

5. The variation in direction of firing within a single line from one line to the next, which can also range from alternation to randomness. For example, one can read lines R-L-R-L or any other variation in direction combination.

6. The number of colors that have the same variables. Typically, printing colors are cyan, magenta, yellow, and black ("CMYK") although special or "spot" colors can also be included in electrostatic printing.

Another aspect of the present invention is the use of a microprocessor to set and vary the above six variables for electrostatic printing in view of the environmental factors present during electrostatic printing in order to visually mute sequence striations.

A feature of the present invention is the ability to configure software or firmware to drive the nibs and plates in a pattern of plate firing sequences that can be controlled to minimize visual perception of sequence striations without actually eliminating such striations.

Another feature of the present invention is the ability of the present invention to configure software or firmware to a pattern of plate firing sequences that can be customized to various printers and various dielectric media used in the printers.

An advantage of the present invention is the visually perceived reduction of sequence striations while maintaining productivity of faster speed electrostatic printers.

The following embodiments will further identify features and advantages of the invention described in conjunction the following drawings.

BRIEF DESCRIPTION OF DRAWINGS

FIG. 2 is an illustration of nib groups that benefit from a pattern of plate firing sequences of the present invention.

EMBODIMENTS OF THE INVENTION

Figure 1:
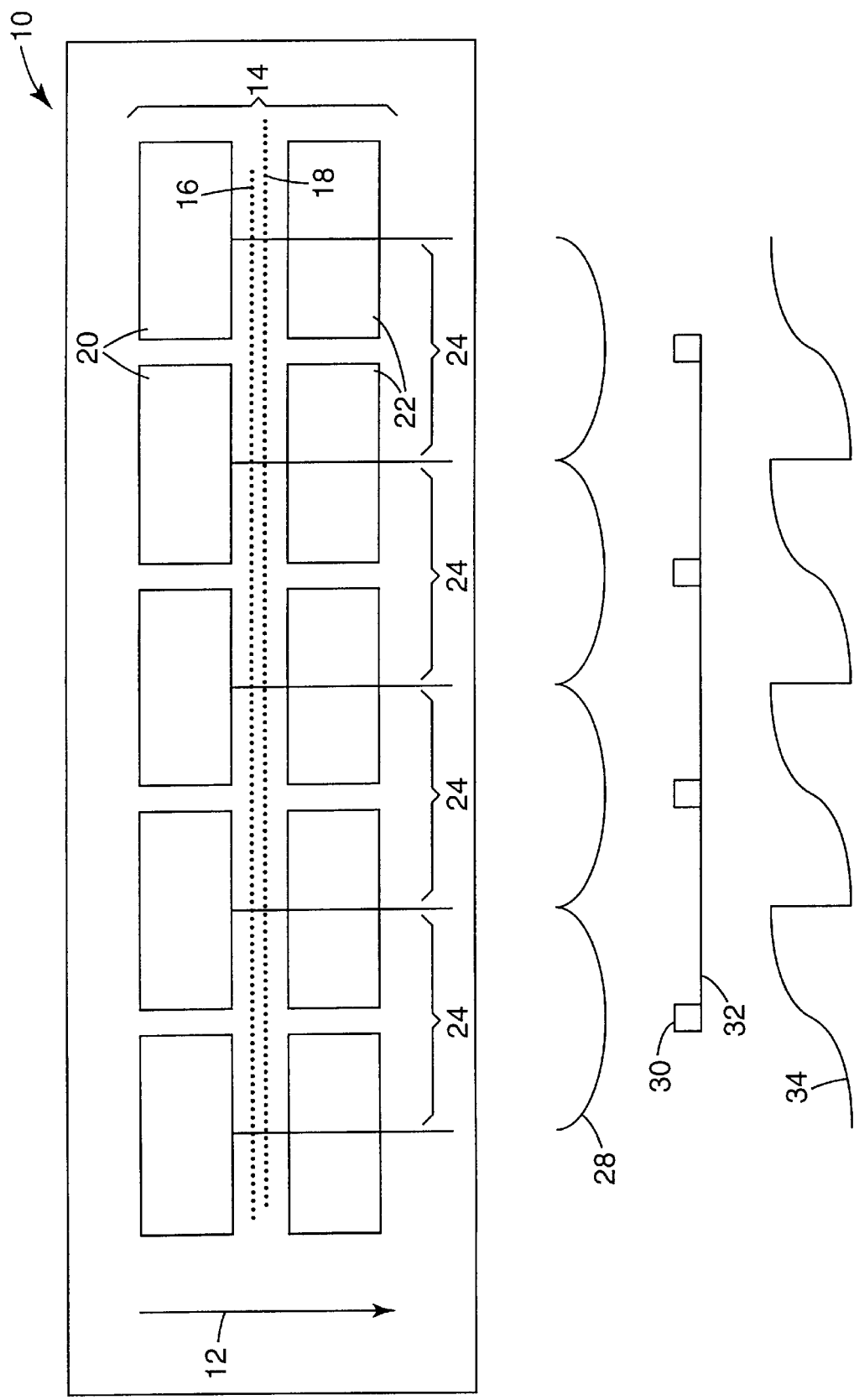
FIG. 1 is an illustration of multiplexing striations possible in electrostatic printing.

FIG. 1 shows hardware configurations of nib and plate groups and the types of multiplexing striations that can result from electrostatic printing. Within printer 10, media moves in the process direction of arrow 12 across a writing head 14 composed of upstream and downstream rows of nibs, 16 and 18, respectively, in a staggered arrangement between corresponding upstream and downstream plate electrodes, 20 and 22, respectively. Nibs 16 and 18 are illustrated as few in number between plates 20 and 22, when in fact several hundred nibs exist in each row 16 and 18 of nibs for each corresponding plate 20 or 22. Multiplexing is arranged across the width of writing head 14 in two nib types, 24 and 26, respectively.

It should be apparent to those skilled in the art that firing of a group of plate electrodes 20 and 22, respectively, also involves the firing of all nibs of a type 24 or 26. In other words, the actual energizing of a given plate group will correspond with the energizing of all nibs of one of type 24 or 26, which are wired in parallel, respectively. Although a plate group determines the location of the energizing of the writing head 14, those skilled in the art often refer to "nib groups" as will be continued in describing the present invention. Indeed for electrostatic printers manufactured by Nippon Steel Corporation, a nib group typically constitutes 4 plates (two from each of plates 20 and 22) and 256 nibs in two staggered rows 16 and 18.

Because the dielectric media is charged by the energizing of a group of plates 20 and 22, along a section of the writing head 14, the parallel wiring of corresponding nib type 24 or 26 is superfluous in all areas along writing head 14, except adjacent to the fired plates.

It should also be apparent to those skilled in the art that rows of nibs 16 and 18 are staggered and separated from one another because of physical limitations of providing all nibs in one row. Therefore, a type of nibs 24 or 26 constitutes individual nibs from row 16 and individual nibs from row 18.

However, because nibs 16 and 18 are physically separated into upstream and downstream rows, the formation of one scan line in a plate firing sequence must take into account the time differential that exists between firing of nib row 16 and nib row 18 as dielectric media passes each row moving in the process direction 12 to produce a given scan line.

At the boundary between adjoining nib groups types 24 and 26, nib group striations depicted as curving line 28 can arise with standard multiplexing. At the gap between adjoining plates 20 and/or between adjoining plates 22 plate gap striations depicted as isolated boxes 30 along line 32 can arise. Sequence striations depicted as line 34 can arise as the plate firing sequence moves left to right across the width of writing head 14. Without variation of plate firing sequences in a pattern among scan lines, affected by the difference in location of rows of nibs 16 and 18, charge density on the dielectric media (not shown) and optical density on the print media takes on a wavy appearance.

The present invention varies the plate firing sequences among scan lines to visually mute sequence striations in very wide, very fast electrostatic printers. More conventional electrostatic printers such as the 9512 Electrostatic Printer (Nippon Steel Corporation, Tokyo, Japan) generally do not produce noticeable sequence striations because the printer employs a sequence pattern that maximizes the amount of time between writing on nearest neighbor and 2nd nearest neighbor groups and because the effects of plate firing sequence are negligible when compared to the speed of electrostatic printing of about 1.3 cm/sec. (0.5 in/sec.) and the limited width of about 91 cm (36 inches).

However, more productive electrostatic printers are both wider and faster, such as a Scotchprint™ 2000 Electrostatic Printer from Minnesota Mining and Manufacturing Company of St. Paul, Minn. This printer operates at a speed approximately four times faster than conventional electrostatic printers: about 5 cm/sec. (2 in/sec.) compounded by a width almost 1.5 times greater: about 132 cm (52 inches). Therefore, the possibility of sequence striations is almost 6 times greater in this printer than conventional printers because the plate firing sequences have more distance to travel across writing head 14 at a much greater printing speed. Both of these reasons reduce the time available for writing, which in turn, for the same plate firing sequences, reduces the amount of time between firing of neighboring groups.

Moreover, the writing head 14 in this printer is divided into three sections (writing in three areas simultaneously to allow sufficient write time at high speed) meaning that boundaries between sections are also affected by sequence striations.

FIG. 2 illustrates the effect of scan lines with plate firing sequence. Upstream nibs 16 and downstream nibs 18 are equally spaced in a staggered array. Upstream nibs 16 fire before downstream nibs 18. Employing an illustration from music in 4/4 time, the upstream nibs 16 fire on a first beat, followed by two beats rest as the media traverses the distance between upstream nibs 16 and downstream nibs 18, followed by firing of the downstream nibs 18 on the fourth beat. Each of the beats of this illustration constitutes a scan line. Therefore, the time difference in firing the upstream nibs 16 from the downstream nibs 18 for any given scan line (i.e., a line along the passing media) also affects the number of scan lines to be included in a single plate firing sequence.

The number of scan lines employing a single plate firing sequence in the present invention can range from 1 to about 16, depending on the resolution of the image, i.e., 200–400 dots per inch (dpi) and the intended viewing distance for the final image. Preferably, the pattern contains plate firing sequences of multiple scan lines each, in order to minimize alternation of plate firing sequences with alternating scan lines. When two different plate firing sequences alternate with alternating scan lines, the time between firing of some of the nib groups is longer than normal (one scan line cycle) and with others it is shorter than normal. This leads to greater overlaps of halftone dots with shorter than normal time between firings and reduced overlaps of dots with longer than normal times. Depending on the interaction between the halftone pattern and the two plate firing sequences, the print density can vary greatly from one nib group to the next.

Moreover, visual perception of sequence striations begins to appear after about 7 scan lines in one plate firing sequence. Therefore, it is also preferable to have a single plate firing sequence for no more than about 7 scan lines before switching to another plate firing sequence. Otherwise, the two sequence striations become individually perceptibly distinct and create a chatter-like artifact in the resulting image that is objectionable.

The pattern of plate firing sequences can vary according to needs of those skilled in the art. Different printers are configured with writing heads having different arrangements of nibs and nib groups and different multiplexing configurations. Therefore, the present invention is not limited to the various combinations discussed herein.

Most commercially available electrostatic printers have write heads that contain two staggered rows of nibs seen in FIG. 2. Nonlimiting examples of such printers include the 9512 Electrostatic Printer manufactured by Nippon Steel Corporation of Tokyo, Japan and the Scotchprint™ 2000 Electrostatic Printer sold by Minnesota Mining and Manufacturing Company of St. Paul, Minn.

In the case of the Scotchprint™ 2000 Electrostatic Printer, the two staggered rows of nibs 16 and 18 are separated physically by a distance equal to two scan lines. Thus, when nibs 18 are writing the data for scan line number 1 (beat 1 using again the music analogy), the nibs 16 are writing the data for scan line number 4 (beat 4 using the music analogy). With this fact in mind, one embodiment of the present invention can take advantage of a pattern that switches sequences every 3 lines, so that each scan line of data has nibs 16 printed with one plate firing sequence and the nibs 18 printed with an opposing plate firing sequence.

Of the six variables discussed above, each of them can be varied to achieve a customized way of solving sequence striations depending on the environmental factors discussed above.

1. The pattern can range from 4 lines to about 64 lines or more depending upon on hardware capacity and desirably from about 14 lines to about 42 lines or 56 lines depending on how many multiples of nib groups are desired.

Presently, there are 28 nib groups in a writing head section on a Scotchprint™ 2000 Electrostatic Printer, which militates toward divisors of 28 to minimize provide density variation across nib groups.

2. The sets in the pattern can range from 2 sets to as many sets as there are lines in the pattern, i.e., every line is a different from every other line in the pattern, which is presently preferred.

3. The starting position of firing in one line can range from random to the same starting point on each line of the pattern, with a desire for variation in starting position on each line of the pattern when coupled with firing direction, presently preferred as being 14 different starting positions in a 28 line pattern with a direction in firing from the right and 14 different starting positions in the 28 line pattern within a firing direction from the left. Even though some starting positions would appear to be the same, the firing direction is different, yielding 28 different vectors for 28 lines in the pattern.

4. The firing order within a single line can range from seriatim to random. It is desired to range from a Skip 3 to a Skip 13 firing order with Skip 3 presently preferred for a "Fast Dithered Texture Stocastic Half Tone Pattern" commercially available on 9512 Electrostatic Printers and Scotchprint™ 2000 Electrostatic Printers. A Skip 5 firing order has been found to provide a maximum differential of firing times between neighboring nibs groups and second nearest neighboring nib groups on a single line, a desirable effect to provide visually muting of sequence striations. But for a balanced striation solution that also minimizes density variation and undesirable texture, a Skip 3 firing order is presently preferred.

5. The variation in direction of firing can range from alternation to randomness and desirably can be any combination in between. Presently preferred is right-left alternation for its simplicity of application. This variable is subsumed into Variable 4 if the firing order on a single line is substantially random.

6. The number of colors that have the same variables can be all, any subset of all, or none, depending on the toners employed for each color. Presently preferred is one group of variables for cyan, magenta, and yellow, with a second group of variables for black to account for the fact that, to maintain registration accuracy, it is desirable to print the registration marks (also known as "tick marks") in a manner that the variation in time of printing the tick marks is constant. The use of more than one set of lines in each pattern randomizes any density and texture variation between nib groups and any variation in not canceling out sequence striations. Practically using more than two plate firing sequences could create a more complex visual muting of sequence striations than opposing plate firing sequences of one embodiment of the present invention because the two opposing plate firing sequences have the advantage of having the exact opposite sequence striation and also having a gradual change in the time between firing of the same group on two consecutive scan lines when the sequences are switched which should give a very gradual density change and texture change across width of printing.

Further, using the firing order in a single line varies the number of scan lines between changing sets in an organized or random way. Instead of changing the firing sequence every 2 or 3 or 4 lines, one could use a pattern of plate firing sequence that changes after 2 lines, then 3, then 4, then 3, then 5, then 3, etc. This pattern could disrupt any interaction with the halftone pattern in terms of balancing the striations of any two sequences. This pattern could also reduce any density or texture variation between nib groups due to the time variation between firings on consecutive scan lines when the plate firing sequence is switched.

The present invention could be combined with other techniques to further reduce the visual perception of sequence striations. For example, another embodiment of the invention optionally adds a variation in the clock cycle of printing so that some scan lines are longer in time than others. This pattern might create additional artifacts but could disrupt the interaction between switching plate firing sequences and the halftone patterns. Also, optionally using "random" halftone patterns (i.e. true error diffusion), such as disclosed in U.S. Pat. No. 5,130,823 (Bowers) would also reduce the interaction effects. All of the above options with the method of the present invention could be combined in varying degrees to potentially give the best printing performance: productivity, striation reduction, texture reduction, density uniformity, and the like.

USERFULNESS OF THE INVENTION

The present invention can be combined with other multiplexing striation solutions to dramatically and unexpectedly improve the print quality of electrostatic images emerging from very fast, very wide electrostatic printers such as the Scotchprint™ 2000 Electrostatic Printer.

This printer employs "dynamic striation control" for nib group boundary striation by looking at the fill level of the data as it is printed and adjusts the amount of voltage reduction to nibs at the end of the nib group accordingly. To overcome the plate gap striations, this printer employs staggered plates, i.e., the plate gap in the downstream set of plates 22 has a "stairstep" in it—effectively this creates a plate gap effect of half the intensity. This printer uses the method of the present invention to reduce sequence striation.

The method of the present invention is best employed with software or firmware in electronic circuitry in an electrostatic printer. The method can be programmed using conventional code writing into read-only memory chips in controller circuitry for the nib groups on each section of a writing head for each color in the electrostatic printer. One skilled in the art will recognize a number of different means to accomplish using the method of the present invention in manners that provide easy adjustment of the variables as environmental factors change. Particularly preferred are pre-settings of variables for each of the various half-tone patterns also resident in controller circuitry for a writing head. Alternatively, the method of the invention can be accomplished from the central processing unit of a computer that drives a printer with the adjustment for environmental factors occurring in "real time" during printing.

Further embodiments are found in the following examples.

EXAMPLE

Example 1

The following table shows an example of a pattern of plate firing sequences for use in a Scotchprint™ 2000 Electrostatic Printer. Using fill levels ranging from 4% to 100%, the resulting image graphic did not have objectionable sequence striations nor objectionable density variations nor objectionable texture. The pattern in the table is a preferred pattern for one half-tone pattern usable in the 2000 Electrostatic Printer and resident in accompanying computer in the system.

| Nib Groups | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| Multiplexing | a | b | a | b | a | b | a | b | a | b | a | b | a | b | a | b | a | b | a | b | a | b | a | b | a | b | a | b |
| Scan Line 1 | 1 | 20 | 11 | 2 | 21 | 12 | 3 | 22 | 13 | 4 | 23 | 14 | 5 | 24 | 15 | 6 | 25 | 16 | 7 | 26 | 17 | 8 | 27 | 18 | 9 | 28 | 19 | 10 |
| 2 | 10 | 19 | 29 | 9 | 18 | 27 | 8 | 17 | 26 | 7 | 16 | 25 | 6 | 15 | 24 | 5 | 14 | 23 | 4 | 13 | 22 | 3 | 12 | 21 | 2 | 11 | 20 | 1 |
| 3 | 5 | 24 | 15 | 6 | 25 | 16 | 7 | 26 | 17 | 8 | 27 | 18 | 9 | 28 | 19 | 10 | 1 | 20 | 11 | 2 | 21 | 12 | 3 | 22 | 13 | 4 | 23 | 14 |
| 4 | 6 | 15 | 24 | 5 | 14 | 23 | 4 | 13 | 22 | 3 | 12 | 21 | 2 | 11 | 20 | 1 | 10 | 19 | 29 | 9 | 18 | 27 | 8 | 17 | 26 | 7 | 16 | 25 |
| 5 | 9 | 28 | 19 | 10 | 1 | 20 | 11 | 2 | 21 | 12 | 3 | 22 | 13 | 4 | 23 | 14 | 5 | 24 | 15 | 6 | 25 | 16 | 7 | 26 | 17 | 8 | 27 | 18 |
| 6 | 2 | 11 | 20 | 1 | 10 | 19 | 29 | 9 | 18 | 27 | 8 | 17 | 26 | 7 | 16 | 25 | 6 | 15 | 24 | 5 | 14 | 23 | 4 | 13 | 22 | 3 | 12 | 21 |
| 7 | 13 | 4 | 23 | 14 | 5 | 24 | 15 | 6 | 25 | 16 | 7 | 26 | 17 | 8 | 27 | 18 | 9 | 28 | 19 | 10 | 1 | 20 | 11 | 2 | 21 | 12 | 3 | 22 |
| 8 | 26 | 7 | 16 | 25 | 6 | 15 | 24 | 5 | 14 | 23 | 4 | 13 | 22 | 3 | 12 | 21 | 2 | 11 | 20 | 1 | 10 | 19 | 29 | 9 | 18 | 27 | 8 | 17 |
| 9 | 17 | 8 | 27 | 18 | 9 | 28 | 19 | 10 | 1 | 20 | 11 | 2 | 21 | 12 | 3 | 22 | 13 | 4 | 23 | 14 | 5 | 24 | 15 | 6 | 25 | 16 | 7 | 26 |
| 10 | 22 | 3 | 12 | 21 | 2 | 11 | 20 | 1 | 10 | 19 | 29 | 9 | 18 | 27 | 8 | 17 | 26 | 7 | 16 | 25 | 6 | 15 | 24 | 5 | 14 | 23 | 4 | 13 |
| 11 | 21 | 12 | 3 | 22 | 13 | 4 | 23 | 14 | 5 | 24 | 15 | 6 | 25 | 16 | 7 | 26 | 17 | 8 | 27 | 18 | 9 | 28 | 19 | 10 | 1 | 20 | 11 | 2 |
| 12 | 18 | 27 | 8 | 17 | 26 | 7 | 16 | 25 | 6 | 15 | 24 | 5 | 14 | 23 | 4 | 13 | 22 | 3 | 12 | 21 | 2 | 11 | 20 | 1 | 10 | 19 | 29 | 9 |
| 13 | 25 | 16 | 7 | 26 | 17 | 8 | 27 | 18 | 9 | 28 | 19 | 10 | 1 | 20 | 11 | 2 | 21 | 12 | 3 | 22 | 13 | 4 | 23 | 14 | 5 | 24 | 15 | 6 |
| 14 | 14 | 23 | 4 | 13 | 22 | 3 | 12 | 21 | 2 | 11 | 20 | 1 | 10 | 19 | 29 | 9 | 18 | 27 | 8 | 17 | 26 | 7 | 16 | 25 | 6 | 15 | 24 | 5 |
| 15 | 28 | 19 | 10 | 1 | 20 | 11 | 2 | 21 | 12 | 3 | 22 | 13 | 4 | 23 | 14 | 5 | 24 | 15 | 6 | 25 | 16 | 7 | 26 | 17 | 8 | 27 | 18 | 9 |
| 16 | 11 | 20 | 1 | 10 | 19 | 29 | 9 | 18 | 27 | 8 | 17 | 26 | 7 | 16 | 25 | 6 | 15 | 24 | 5 | 14 | 23 | 4 | 13 | 22 | 3 | 12 | 21 | 2 |
| 17 | 4 | 23 | 14 | 5 | 24 | 15 | 6 | 25 | 16 | 7 | 26 | 17 | 8 | 27 | 18 | 9 | 28 | 19 | 10 | 1 | 20 | 11 | 2 | 21 | 12 | 3 | 22 | 13 |
| 18 | 7 | 16 | 25 | 6 | 15 | 24 | 5 | 14 | 23 | 4 | 13 | 22 | 3 | 12 | 21 | 2 | 11 | 20 | 1 | 10 | 19 | 29 | 9 | 18 | 27 | 8 | 17 | 26 |
| 19 | 8 | 27 | 18 | 9 | 28 | 19 | 10 | 1 | 20 | 11 | 2 | 21 | 12 | 3 | 22 | 13 | 4 | 23 | 14 | 5 | 24 | 15 | 6 | 25 | 16 | 7 | 26 | 17 |
| 20 | 3 | 12 | 21 | 2 | 11 | 20 | 1 | 10 | 19 | 29 | 9 | 18 | 27 | 8 | 17 | 26 | 7 | 16 | 25 | 6 | 15 | 24 | 5 | 14 | 23 | 4 | 13 | 22 |
| 21 | 12 | 3 | 22 | 13 | 4 | 23 | 14 | 5 | 24 | 15 | 6 | 25 | 16 | 7 | 26 | 17 | 8 | 27 | 18 | 9 | 28 | 19 | 10 | 1 | 20 | 11 | 2 | 21 |
| 22 | 27 | 8 | 17 | 26 | 7 | 16 | 25 | 6 | 15 | 24 | 5 | 14 | 23 | 4 | 13 | 22 | 3 | 12 | 21 | 2 | 11 | 20 | 1 | 10 | 19 | 29 | 9 | 18 |
| 23 | 16 | 7 | 26 | 17 | 8 | 27 | 18 | 9 | 28 | 19 | 10 | 1 | 20 | 11 | 2 | 21 | 12 | 3 | 22 | 13 | 4 | 23 | 14 | 5 | 24 | 15 | 6 | 25 |
| 24 | 23 | 4 | 13 | 22 | 3 | 12 | 21 | 2 | 11 | 20 | 1 | 10 | 19 | 29 | 9 | 18 | 27 | 8 | 17 | 26 | 7 | 16 | 25 | 6 | 15 | 24 | 5 | 14 |
| 25 | 20 | 11 | 2 | 21 | 12 | 3 | 22 | 13 | 4 | 23 | 14 | 5 | 24 | 15 | 6 | 25 | 16 | 7 | 26 | 17 | 8 | 27 | 18 | 9 | 28 | 19 | 10 | 1 |
| 26 | 19 | 29 | 9 | 18 | 27 | 8 | 17 | 26 | 7 | 16 | 25 | 6 | 15 | 24 | 5 | 14 | 23 | 4 | 13 | 22 | 3 | 12 | 21 | 2 | 11 | 20 | 1 | 10 |
| 27 | 24 | 15 | 6 | 25 | 16 | 7 | 26 | 17 | 8 | 27 | 18 | 9 | 28 | 19 | 10 | 1 | 20 | 11 | 2 | 21 | 12 | 3 | 22 | 13 | 4 | 23 | 14 | 5 |
| 28 | 15 | 24 | 5 | 14 | 23 | 4 | 13 | 22 | 3 | 12 | 21 | 2 | 11 | 20 | 1 | 10 | 19 | 29 | 9 | 18 | 27 | 8 | 17 | 26 | 7 | 16 | 25 | 6 |

The above table demonstrates only one of many possible successful combinations of variables that can be employed in reducing sequence striations without generating other problems for image quality. With the number of possible variables and the range of possibilities within each variable, one skilled in the art can accommodate almost any environmental factor with a given electrostatic printer to arrive at a solution to the problem of sequence striations without generating other image quality problems. Image quality is within the perceptions by the human eye. Each of the environmental factors can play a role in determining which variable should be adjusted in which direction to achieve maximum image quality.

The invention is not limited to these embodiments. The claims follow.

What is claimed is:

1. A method for reducing sequence striations on a printed article, comprising the steps of:
   selecting a pattern of energizing plate electrodes and associated nib groups according to any combination of variables comprising:
   (a) the number of lines arranged in a pattern in a direction of travel of the article, wherein the pattern includes a minimum of 4 lines;
   (b) the number of sets of lines in the pattern;
   (c) the starting position of a firing sequence order of plate electrodes and associated nib groups in one line in the pattern compared to adjacent lines in the pattern;
   (d) the firing sequence order of plate electrodes and associated nib groups within a single line in the pattern;
   (e) the variation in direction of firing of the firing sequence order of plate electrodes and associated nib groups within a single line in the pattern compared to adjacent lines in the pattern; and
   (f) the number of printing colors having the same variables; and energizing the plate electrodes and associated nib groups according to the pattern.

2. The method according to claim 1, wherein the selecting step is performed in recognition of environmental factors comprising:
   (a) print media conductivity;
   (b) half tone pattern used;
   (c) fill level of the selected image and rate of change of fill level across an image;
   (d) viewing distance of the image; and
   (e) applied voltages.

3. The method according to claim 1, wherein the selecting step and the energizing step employ software or firmware controlling an electrostatic printer.

4. The method according to claim 1, wherein the selecting step variable (a) ranges from 4 to about 64.

5. The method according to claim 1, wherein the selecting step variable (b) ranges from two sets to as many sets as there are lines in the pattern of variable (a).

6. The method according to claim 1, wherein the selecting step variable (c) ranges from random to the same starting point on each line of the pattern.

7. The method according to claim 1, wherein the selecting step variable (d) ranges from seriatim to random.

8. The method according to claim 7, wherein the selecting step variable (d) ranges from Skip 3 firing order to Skip 13 firing order.

9. The method according to claim 1, wherein the selecting step variable (e) ranges from alternation to randomness.

10. The method according to claim 1, wherein the selecting step variable (f) ranges from all colors have the same variables to no two colors have the same variable.

11. A system for reducing sequence striation, comprising:

means for selecting a pattern of energizing plate electrodes and associated nib groups according to any combination of variables comprising:
  (a) the number of lines arranged in a pattern in a direction of travel of the article, wherein the pattern includes a minimum of 4 lines;
  (b) the number of sets of lines in the pattern;
  (c) the starting position of a firing sequence order of plate electrodes and associated nib groups in one line in the pattern compared to adjacent lines in the pattern;
  (d) the firing sequence order of plate electrodes and associated nib groups within a single line in the pattern;
  (e) the variation in direction of firing of the firing sequence order of plate electrodes and associated nib groups within a single line in the pattern compared to adjacent lines in the pattern; and
  (f) the number of printing colors having the same variables; and means for energizing the plate electrodes and associated nib groups according to the pattern.

12. The system according to claim 11, further comprising means for recognizing environmental factors comprising:
  (a) print media conductivity;
  (b) half tone pattern used;
  (c) fill level of the selected image and rate of change of fill level across an image;
  (d) viewing distance of the image; and
  (e) applied voltages.

13. The system according to claim 11, wherein the means for selecting and the means for energizing employ software or firmware controlling an electrostatic printer.

14. The system according to claim 11, wherein the means for selecting variable (a) ranges from 4 to about 64.

15. The system according to claim 11, wherein the means for selecting variable (b) ranges from two sets to as many sets as there are lines in the pattern of variable (a).

16. The system according to claim 11, wherein the selecting step variable (c) ranges from random to the same starting point on each line of the pattern.

17. The system according to claim 11, wherein the selecting step variable (d) ranges from seriatim to random.

18. The system according to claim 17, wherein the selecting step variable (d) ranges from Skip 3 firing order to Skip 13 firing order.

19. The system according to claim 11, wherein the means for selecting variable (e) ranges from alternation to randomness.

20. The method according to claim 11, wherein the means for selecting variable (f) ranges from all colors have the same variables to no two colors have the same variable.

* * * * *